United States Patent Office 3,256,477
Patented June 14, 1966

3,256,477
DEVICES FOR MEASURING WEAK MAGNETIC FIELDS, IN PARTICULAR THE EARTH MAGNETIC FIELD, BY NUCLEAR INDUCTION
Daniel Gautier, Meudon-la-Foret, André Rochet, Meylan, and Pierre Servoz-Gavin, Grenoble, France, assignors to Commissariat à l'Énergie Atomique, Paris, France, an organization of France
Filed Dec. 9, 1963, Ser. No. 328,796
Claims priority, application France, Dec. 11, 1962, 918,271
5 Claims. (Cl. 324—.5)

The present invention relates to devices for measuring weak magnetic fields (lower than approximately 10 gauss), and in particular the earth total magnetic field (and its variations), said devices being of the kind disclosed in the U.S. patent application Ser. No. 120,649, filed June 29, 1961 in the names of Georges Bonnet, Jean-Louis Laffon and Pierre Servoz-Gavin for Methods and Devices For Measuring Small Magnetic Fields, in Particular the Earth Magnetic Field, by Nuclear Induction, now U.S. Patent No. 3,133,243, patented May 12, 1964, and making use of a liquid sample including dissolved in a solvent containing atomic nuclei having an angular momentum (or spin) and a magnetic moment both different from zero, a hyperfine structure paramagnetic substance undergoing the Overhauser-Abragam effect when an electric resonance line of this substance is saturated by an electromagnetic field.

The object of the present invention is to increase both the rapidity, and therefore the frequency of repetition, of the magnetic field intensity measurements and the sensitivity and accuracy of such measurements.

Said prior patent application was concerned with methods and devices for measuring weak magnetic field by means of a sample of material containing atomic nuclei having an angular momentum and a magnetic moment both different from zero—that is to say by applying an auxiliary magnetic field substantially perpendicular to the magnetic field to be measured, so as to give the magnetic moments of the atomic nuclei of the sample the same direction as the resultant magnetic field, and then suddenly cancelling this auxiliary field to permit the magnetic moments of said atomic nuclei to have a free precession movement about the magnetic field to be measured with a frequency, called Larmor frequency, strictly proportional to the intensity of this magnetic field, measurement of the frequency of the electromotive force that is generated (in a coil surrounding said sample and having its axis perpendicular to the field to be measured) by the rotating field (at the Larmor frequency) associated with this precession of the magnetic moment, making it possible to deduce therefrom the intensity of the magnetic field to be measured (said coil also serving, as a rule, owing to a suitable switching device, to create, when it is fed with a unidirectional current, the auxiliary field)— in which method and apparatus:

on the one hand the sample consisted of a solvent containing atomic nuclei having a magnetic moment and an angular momentum both different from zero, in which was dissolved a paramagnetic substance of hyperfine structure capable of producing the Overhauser-Abragam effect (for instance potassium nitrosodisulfonate) and subjected to a radio-electric field at the electronic resonance frequency for saturating one of its electronic resonance lines having an hyperfine structure, and on the other hand the intensity of the auxiliary magnetic field was of an order of magnitude little higher than that of the intensity of the magnetic field to be measured (for instance the intensity of the auxiliary field was of the order of five times the intensity of the field to be measured, whereas, prior to this invention, in the absence of a paramagnetic substance, use was made of an auxiliary field of an intensity equal to one or several hundreds of times that of the field to be measured), these method and device being essentially characterized in that, contrary to the prior practice, according to which the duration of application of the auxiliary magnetic field was at least about two seconds the auxiliary field was applied only for a much shorter time, of the order of the Larmor period, equal to about 0.5 millisecond in the earth field for hydrogen nuclei (protons), in particular for a time a little or substantially higher than a quarter of this period.

Owing to the reduction of the period of application of the auxiliary field to a fraction of a millisecond, the duration of every measurement of the magnetic field was reduced and therefore the frequency of repetition of the measurements was increased, being nearly doubled (the period of the free precession for which the precession frequency is determined averaged 2–3 seconds in the prior art).

It will further be reminded that in said prior patent the frequency of free precession was measured by means of a frequency meter which included means for producing a rectangular signal of a duration equal to a predetermined integral number of Larmor periods and a counter capable of counting clock pulses (transmitted at a constant repetition frequency) during the duration of this signal, the number of these pulses being inversely proportional to the intensity of the magnetic field to be measured.

Finally, the prior patent disclosed a fully electronic embodiment of the switch device which connected the coil surrounding the sample alternately to a generator of unidirectional current to produce the auxiliary field and to the amplifier connected to the frequency meter to permit determining the free precession frequency, therefore an ultra quick switching device, which increased the frequency of repetition of the measurement.

The object of the present invention is further to increase the frequency of repetition of the measurements by reducing the free precession period, in particular the time interval between the end of the period for determining the free precession frequency and the beginning of the period of application of the auxiliary field for the next magnetic field measurement. As a matter of fact it was necessary, up to the present time, to wait until the magnetic moments under free precession conditions were substantially in line with the magnetic field to be measured, under the effect of the damping of this precession, before applying the auxiliary field, if it were desired to produce with certainty, in the coil surrounding the sample, a sufficiently high electromotive force, by free precession of the magnetic moments of the atomic nuclei having a magnetic moment and an angular momentum different from zero, because the amplitude of this electromotive force depended, if, at the time of application of the auxiliary field, the magnetic moments had not had time to be again alined with the field to be measured, upon the position of these moments upon the precession cone, the amplitude being variable from one value to twice this value, which is not admissible for an accurate and sensitive measurement. It was therefore necessary to wait for several seconds (for instance from two to three seconds) before again applying the auxiliary field. Finally, even with the improvements according to the main application, every measurement lasted from two to three seconds, despite the reduction of the period of application of the auxiliary field to about one millisecond.

According to the present invention the application of the auxiliary magnetic field, for every measurement operation, is made to begin after the determination of the frequency of the precession signal of the preceding measurement operation, when the magnetic moments of the sample occupy, before being once more in line with the magnetic field to be measured, a well determined and constant position on the precession cone, that is to say for a given phase angle of the electromotive force induced by the precession of these magnetic moments, this position and angle corresponding substantially to the maximum amplitude of said precession signal.

Therefore, the device according to the present invention comprises means for deriving from the rectangular signal, of a duration equal to a predetermined integral number of Larmor periods, produced in the frequency meter, a pulse synchronous with one of the edges (the leading one or preferably, the trailing one) of the signal, means for delaying this pulse by a constant but adjustable amount (which may be shorter than the Larmor period), and means for causing the delayed pulse to start the unidirectional current which creates the auxiliary magnetic field in the coil surrounding the sample.

In particular, the device may comprise a differentiating circuit for deriving the pulse from the end or edge of the above mentioned rectangular signal and a delay circuit, preferably of the monostable multivibrator type with an adjustable delay, for delaying said pulse by a constant but adjustable amount, the delayed pulse being applied to the above mentioned switch device to connect said coil with the unidirectional current generator.

The invention is in particular concerned with magnetometers intended to measure the earth magnetic field and its variations, for example for ore prospection purposes.

A preferred embodiment of the present invention will be hereinafter described with reference to the appended drawings, given merely by way of example, and in which.

Figure 1:
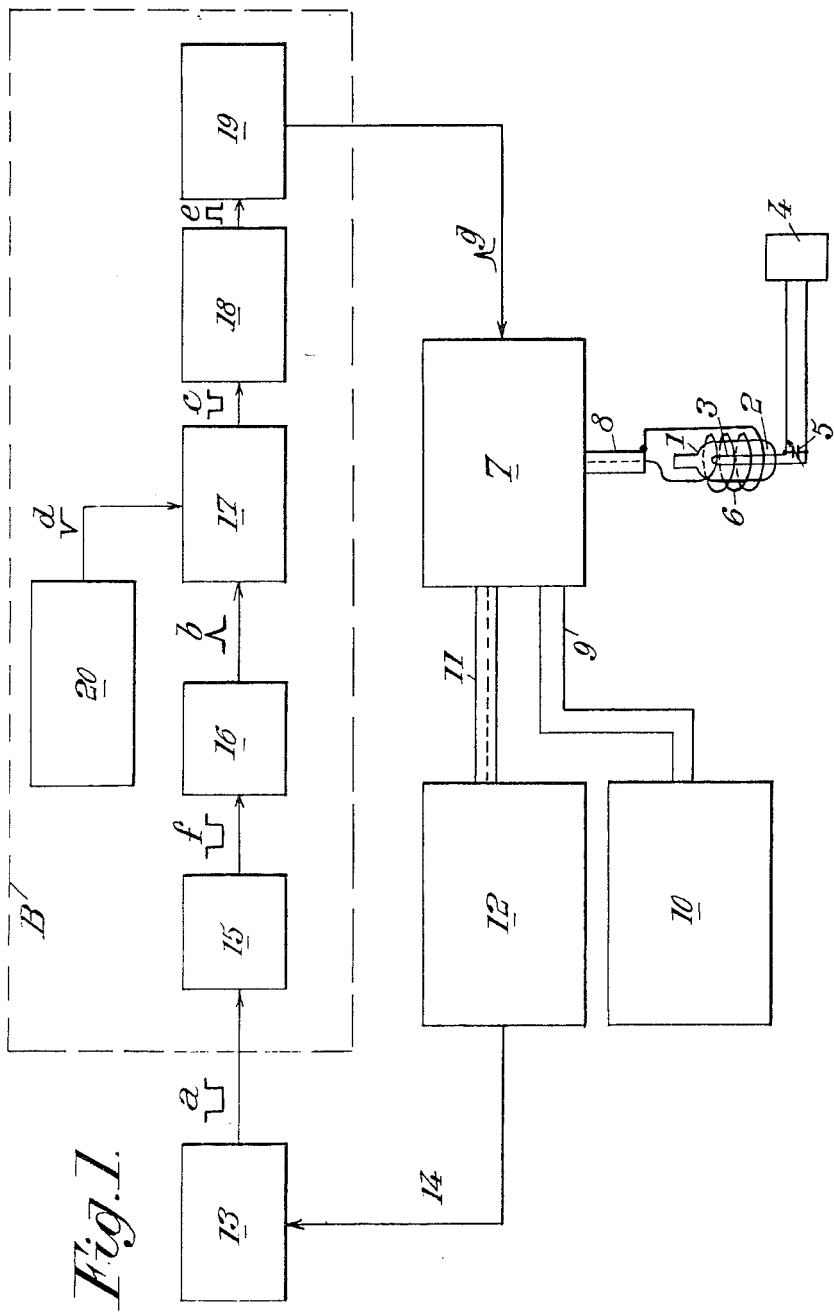
FIG. 1 is a block diagram showing a device for measuring weak magnetic fields by nuclear induction according to the present invention.

Referring to FIG. 1 the structure of a magnetometer according to said prior patent includes the following elements:

a vessel 1 containing a sample or solution 2 consisting of a solvent (in particular water) containing atomic nuclei (in particular protons) having a magnetic moment and an angular momentum both different from zero, and of a paramagnetic substance of hyperfine structure of the bound type presenting a separation (between energetic levels) different from zero in a zero magnetic field (in particular potassium nitrosodisulfonate of a concentration of one thousandth of a molecule gram per liter);

a coil 3 consisting of a very small number of spires (for instance one or two turns) immersed in Sample 2, said coil 3 being fed with a high frequency voltage of a frequency equal to the electronic resonance frequency of the paramagnetic substance in the field to be measured (in particular about 55 mc./s. in the case of an aqueous solution of potassium nitrosodisulfonate placed in the earth magnetic field) from a high frequency generator 4 working at said high frequency, a variable capacitor 5 serving to adjust the tuning frequency of the resonating circuit 3–5 to said electronic resonance high frequency;

a coil 6 having a great number of turns (for instance one thousand), surounding vessel 1 and disposed so that its axis forms with the axis of coil 3 and the direction of the magnetic field to be measured a trihedral having its sides substantially at right angles to one another;

a switching device 7 which permits of connecting coaxial cable 8, itself connected to the terminals of coil 6, either with conductor 9, which is fed from a generator 10 with a unidirectional voltage (capable of creating, by means of coil 6, the auxiliary field substantially perpendicular to the direction of the magnetic field to be measured) or with coaxial cable 11 to feed an amplifier 12 with the electromotive force at the nuclear resonance frequency (or Larmor frequency strictly proportional to the intensity of the magnetic field to be measured) created in coil 6 by the free precession of said atomic nuclei after sudden canceling of the auxiliary field (sudden canceling meaning a canceling taking place within a time period shorter than the Larmor frequency in the field to be measured, that is to say about 0.5 millisecond in the case of the measurement of the earth magnetic field with atomic nuclei consisting of protons);

a frequency meter 13 receiving through a conductor 14 the electromotive force amplified in amplifier 12, this frequency meter being capable of supplying a rectangular signal, hereinafter called "precounting" signal, the duration of which is equal to a predetermined integral number of Larmor periods (this number being possibly adjustable in the case of some magnetometers having several ranges of precision, since the precision increases with this number), and a counter capable of counting the number of clock pulses emitted at a constant frequency by a clock (belonging to the counter) during the time of said precounting signal, the number of clock pulses that is counted being proportional to the duration of the precounting signal, that is to say inversely proportional to the Larmor frequency and therefore to the intensity of the magnetic field to be measured; and means for programming the switching of switch 7.

In the apparatus described in the above mentioned prior patent, the switching device was controlled in such manner as to connect, during a predetermined time (of the order of the millisecond), conductor 9 with coaxial cable 8, then, for a time which was also constant, but the order of magnitude of which ranged from two to three seconds or even more, coaxial cable 8 with coaxial cable 11, the last mentioned duration being sufficient to ensure realignment of the magnetic moments of said atomic nuclei with respect to the magnetic field to be measured.

Figure 2:
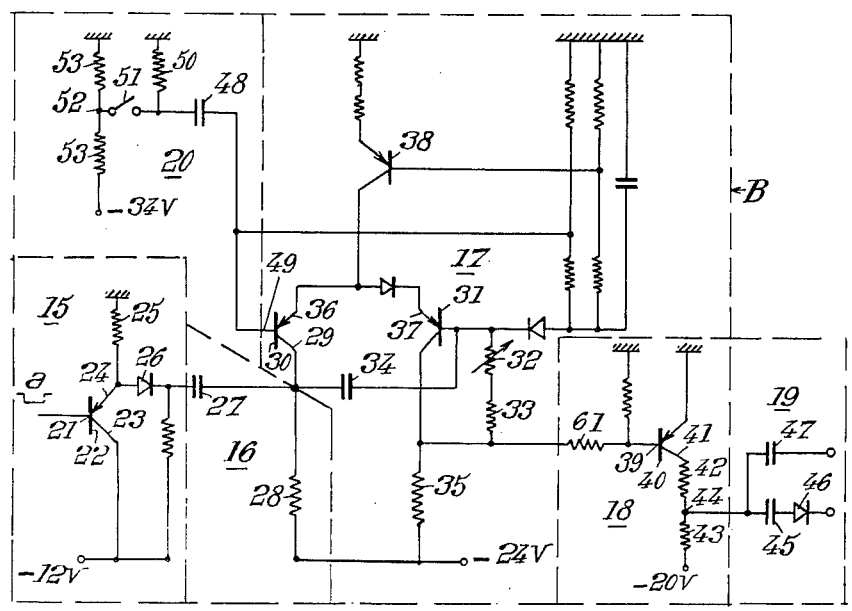
FIG. 2 shows a preferred embodiment of the means for deriving from the rectangular signal created in the frequency meter the pulse that controls the switching device, this FIG. 2 illustrating in detailed fashion an embodiment of the portion of FIG. 1 surrounded by a dotted lines rectangle.

On the contrary according to the present invention:

on the one hand, concerning the method, the auxiliary magnetic field (obtained when coil 6 is connected with generator 10) is caused to begin, for every magnetic field measurement operation, after determination of the frequency of the precession signal (by means of frequency meter 13) during the preceding measurement operation, when the magnetic moments of the atomic nuclei of liquid 2 occupy, when moving toward realignment with the magnetic field to be measured, a well determined constant position on the precession cone, that is to say for a given phase angle of the electromotive force induced in coil 6 by the precession of these magnetic moments, said position and said angle corresponding substantially to the maximum amplitude of the precession signal; and on the other hand, concerning the device, it includes a unit B (a preferred embodiment of which is illustrated in detailed fashion in FIG. 2) including means 15–16 for deriving, from the precounting rectangle signal $a$ of a duration equal to a given integral number of Larmor periods produced in frequency meter 13, a pulse $b$ synchronous with either the beginning or preferably the end of this precounting signal $a$, means 17 for delaying this pulse $b$ by a small constant but adjustable duration (which may be shorter than the duration of a Larmor period), and means 18, 19 for causing, by action (through a pulse $g$) on switching device 7, the delayed pulse $c$ start the unidirectional current which creates the auxiliary magnetic field in coil 6 which surrounds vessel 1. Finally means 20, in the form of a pulse generating circuit shown in FIG. 2, are advantageously provided for controlling the beginning of the operation, that is to say initiating the first application of the unidirectional current to produce the auxiliary magnetic field by means of coil 6.

In particular, unit B may comprise a separating stage 15 of cathode-follower or emitter-follower type transforming signal $a$ into a signal $f$ of well determined polarity, shape and amplitude, a differentiating circuit 16 (for instance of the type including a capacitor and a resistor) deriving a pulse $b$ from the end of signal $a$ such as transformed into $f$ by separator 15, and a delay circuit 17, advantageously of the monostable multivibrator type, triggered to pass from its first stable state into its second unstable or astable state by a pulse $b$ supplied from differentiating circuit 16 or by a pulse $d$ created in means 20 for use at the beginning of the operation under the effect of an external control, and remaining in its second state during a short but adjustable constant time before returning to its first stable state, said delay circuit thus producing a delayed voltage step or pulse $c$ which, after reversal of polarity in a circuit 18 is applied as a step or pulse $e$ to the input switch circuit 19 which controls, through pulse $g$, switch device 7 for connecting coil 6 to generator 10.

A preferred embodiment of unit B is illustrated by FIG. 2, by way of example.

The precounting rectangular signal $a$, which is for instance a negative rectangular signal of −7 volts, the size of which is determined by the desired duration of counting of the clock pulses, is applied to the base 21 of a transistor 22 (for instance of the SFT 228 type) mounted in emitter-follower fashion (a mounting which is equivalent for transistors to the cathode-follower mounting for triodes). The collector 23 of transistor 22 is kept at −12 volts whereas the emitter 24 is connected with the earth (through a resistor 25 of 820 ohms). There is thus produced in emitter 24 a signal which after passing through diode 26 is differentiated in circuit 16 comprising a capacitor 27 (of 0.22 microfarad) and a resistor 28 (1200 ohms).

The positive pulse ($b$ in FIG. 1) corresponding to the end of the precounting signal $a$ is applied to the collector 29 of a transistor 30 (which is mounted in relation to a transistor 31 as a nonostable multivibrator). This transistor 30 shifts from its blocked state to its saturated state. This shifting produces the blocking of the identical transistor 31. After a very short time, which may be of the order of a portion of a millisecond, determined by the value to which has been adjusted resistor 32 (of maximum value equal to 22,000 ohms) in series with fixed resistor 33 (also of 22,000 ohms), and also by the value of fixed capacitor 34 (of 0.5 microfarad), transistor 31 again shifts into saturated state. At the same time transistor 30 returns to its initial state, that is to say to the blocked state.

The collector 29 of transistor 30 is connected to a terminal at a voltage of −24 volts through resistor 28 (of 1200 ohms), whereas the collector of transistor 31 is connected to this terminal at a voltage of −24 volts through a resistor 35 (of 1000 ohms). The respective emitters 36 and 37 of transistors 30 and 31 are fed through a transistor 38 the effect and purpose of which is to accelerate the speed of shifting of transistors 30 and 31.

Monostable multivibrator 17 delivers a negative rectangular signal ($c$ in FIG. 1) ranging from −24 volts to −18 volts which is applied to the base 39 of a transistor 40 through a resistor 41 (of 10,000 ohms), transistor 40 having for its effect to reverse the signal emitted by the monostable multivibrator, thus producing a positive signal ($e$ of FIG. 1).

The collector 41 of transistor 40 is connected to a terminal at a potential of −20 or −24 volts through two resistors 42 and 43 in series (respectively of 2200 and 2700 ohms). A rectangular signal ranging from −10 volts to 0 volt is available at 44 between resistors 42 and 43 (it is the signal $e$ of FIG. 1).

This positive signal is sent to the input of switch 19, in particular to control the beginning of application of the unidirectional voltage which produces in coil 6 the auxiliary field. As a matter of fact, it is possible to use the rectangular signal available at point 44 to perform two functions by feeding it to two monostable multivibrators, not shown on the drawings, to wit to produce a positive pulse corresponding to the beginning of this rectangular signal and applied through capacitor 45 and a diode 46 to a first monostable multivibrator which controls a relay in switching device 7, and a negative pulse corresponding to the end of said rectangular signal, which is applied, through capacitor 47 to a second monostable multivibrator which produces pulse $g$ (FIG. 1) which controls the auxiliary field pulse $h$ (which will be hereinafter referred to when describing FIG. 3).

Finally, the pulse generating circuit or means 20 comprises a capacitor 48 (of 0.1 microfarad) one plate of which is connected to the base 49 of transistor 30 and the other plate of which, normally earthed through a resistor 50, may be brought, by manually closing switch 51, to a potential of −17 volts available at point 52, which is connected through two equal resistors 53 (each of 10,000 ohms) on the one hand to the earth and on the other hand to a terminal at −34 volts. When switch 51 is closed a negative pulse $d$ is sent to the base 49 of transistor 30, which is saturated, thus producing the same cycle of operation as in the automatic actuation by means of rectangular signal $a$.

Figure 3:
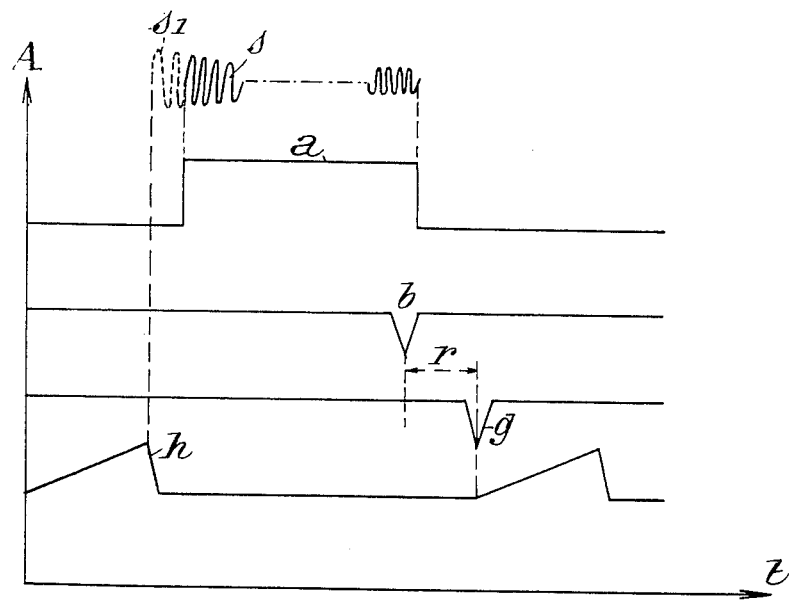
FIG. 3 illustrates wave shapes and pulse shapes as produced in the different units of FIGS. 1 and 2.

The operation of the device according to FIGS. 1 and 2 will be better understood when referring to FIG. 3 where some of the signals brought into play in this device have been shown, the polarities of the signals or pulses being generally different in FIGS. 1 and 2 on the one hand and in FIG. 3 on the other hand.

The alternating voltage at the Larmor frequency available at the output of amplifier 12 is of the damped type. It is necessary, as stated in the above mentioned prior patent, to wait for the end of the initial transition period (oscillations $s_1$) before counting begins. This is why the precounting signal $a$ starts only slightly after the end $h$ of the unidirectional voltage creating the auxiliary field.

In view of the fact that it is desired to count an integral number of Larmor periods, that is to say of oscillations $s$ succeeding to oscillations $s_1$ at the output of amplifier 12, the precounting signal $a$ starts when an oscillation $s$ passes through zero and it stops after a given number of periods, that is to say also when an oscillation $s$ passes through zero (that is to say when the magnetic moments of the atomic nuclei 1 are parallel to the axis of coil 6).

The end of the precounting signal $a$ produces pulse $b$, the latter in turn creating pulse $g$ delayed by $r$ with respect to $b$, $r$ being adjustable. As for pulse $g$, it produces the beginning of the unidirectional voltage pulse serving to create the auxiliary field in coil 6, so that a new measurement operation follows.

The advantages of the method and device according to the present invention will now be explained with reference to FIGS. 4 to 6 over the method and device disclosed in the above mentioned prior patent, the reference characters of FIG. 3 being also used in FIGS. 4 to 6.

Figure 4:
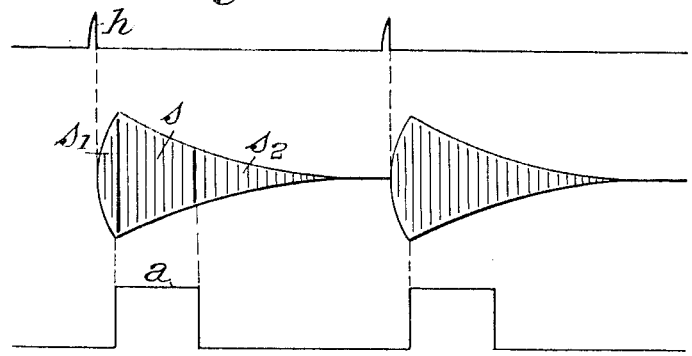
FIG. 4 shows the wave shapes and pulse shapes produced in the case of a magnetic field measurement device according to the above mentioned prior patent.

FIG. 4 corresponds to the case of a device according to the prior patent wherein the magnetic moments are left to come again in line with the magnetic field to be measured at the end of every measurement operation before again applying the auxiliary magnetic field. In this case, at the end $h$ of the unidirectional voltage pulse producing the auxiliary field, there is created, at the output of amplifier 12, when switch device 7 connects coil 6 with said amplifier 12, first oscillations $s_1$ then, during the precounting signal $a$, oscillations $s$, signal $a$ having a duration equal to a constant number of said oscillations $s$. After the end of precounting signal $a$, the following oscillations $s_2$ are left time to be sufficiently damped to enable the magnetic moments of the automatic nuclei to be again in line with the magnetic field to be measured, before applying a new unidirectional voltage creating the auxiliary field. Oscillations $s$ of an amplitude reproducible from one measurement to the next one are obtained, but the interval of time between two successive measurements ranges from two to three seconds, because, if the first period of application of the auxiliary field is very short (of the order of magnitude of the millisecond according to the prior patent), the second period of free precession must be sufficiently long to enable the magnetic moments to be again alined with the field to be measured.

Figure 5:
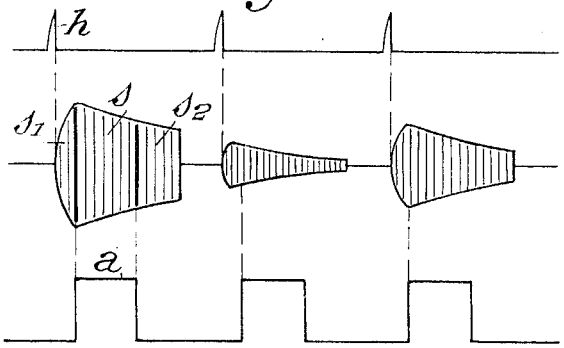
FIG. 5 shows wave shapes and pulse shapes of a measurement device also made according to the prior patent but without permitting the magnetic moments to come back into line with the field to be measured.

On the contrary, if it is tried, as in the case of FIG. 5, to begin the application of the auxiliary field before complete realinement of the magnetic moments with the auxiliary field, it is found that the useful precession signals $s$ become unequal in amplitude in the successive measurements, due to the fact that this amplitude depends upon the position occupied by the nuclear magnetic moments of sample 2 when the auxiliary field is applied. This variation of amplitude involves a reduction of precision and consequently an operation according to FIG. 5 cannot be admitted when some precision is wanted.

Figure 6:
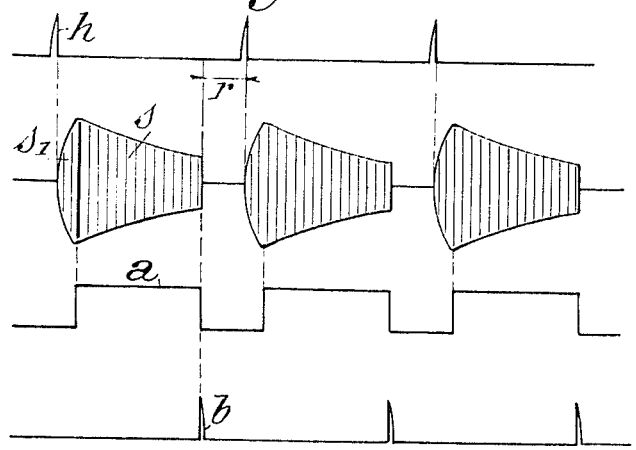
FIG. 6 shows the wave shapes and pulse shapes in the case of a device according to the present invention.

On the contrary, FIG. 6 shows that the operation in the case of the improvements according to the present invention is very interesting, because it combines the advantages of the operation according to FIG. 4 (constant amplitude of signals $s$ during the successive operations due to the fact that the nuclear moments of sample 2 occupy, when the auxiliary field is applied, always the same position on the precession cone, which position may be chosen by adjusting delay $r$) with the rapidity of measurement of the operation according to FIG. 5 because it is no more necessary to wait for complete realignment of the magnetic moments with the direction of the field to be measured.

Practically, at the beginning of every measurement cycle, delay $r$ is adjusted, by means of the adjustable resistor 32 of FIG. 2, in such manner as to have signals or oscillations $s$ of maximum amplitude.

It will be noted that at the end of the precounting signal $a$, the magnetic moments are always in a well determined position, to wit that for which they are parallel to the axis of coil 6, and that, consequently, after a constant but adjustable time $r$, these magnetic moments always occupy the same position on the precession cone, this position depending upon $r$. The fact that $r$ is adjustable therefore permits of choosing the position of the nuclear magnetic moments on the precession cone at the time when the auxiliary field is applied and this is why free precession signals are obtained which can be reproduced from one operation to the next one.

The device above described works perfectly well with an auxiliary field of an intensity of one gauss when measuring the earth magnetic field, which is of about 0.5 gauss, with a duration of application of the auxiliary field of 0.1 millisecond and a total duration of every magnetic field measurement operation of 0.2 second, which permits of obtaining a rate of five measurements per second.

The method and apparatus according to the present invention have many advantages and in particular the following ones:

First they permit of measuring weak magnetic fields and in particular the earth magnetic field, with a high precision.

The duration of every measurement may be reduced to a portion of a second which permits of performing several measurements per second, a rate which is particularly interesting when it is desired to perform magnetic prospection by means of a magnetometer mounted on an aircraft in view of the fact that the speed of said aircraft (unless it is a helicopter) cannot be reduced below a given value.

The sensitivity and accuracy of the magnetic field measurement are constant during the time of the operation.

The apparatus necessary for applying the auxiliary field is very much reduced due to the fact that it is sufficient to have an auxiliary magnetic field of the order of magnitude of twice the magnetic field to be measured.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. Device for measuring the intensity of a weak magnetic field comprising in combination:

a vessel containing a solution constituted by a solvent with atomic nuclei having non-zero magnetic moments and by paramagnetic ions dissolved in said solvent, said ions including unpaired electrons and having an electronic resonance line saturable by an alternating field at a non-zero frequency;

means for producing inside said vessel in said solution an alternating field at said non-zero frequency;

a coil disposed around said vessel to be oriented in use with the axis thereof at a substantial angle to the direction of the magnetic field to be measured in which is located in use said vessel;

a source of D.C.;

frequency-measuring means adapted to determine the frequency of an alternating electromotive force;

switching means adapted to connect said coil either to said source of D.C., thereby creating by said coil in said solution an auxiliary D.C. magnetic field of a direction making in use a substantial angle with the direction of the magnetic field to be measured, or to said frequency-measuring means, for determining the frequency of the alternating electromotive force induced in said coil by the free precession motion of said magnetic moments of said atomic nuclei at a frequency proportional to the intensity of the magnetic field to be measured in which is located in use said vessel;

control means for alternatively switching said switching means to have said coil alternatively connected to said source of D.C. for recurrent first time intervals having a duration of the order of the period of said free precession motion and to said frequency-measuring means for recurrent second time intervals alternating with said first time intervals and ending when the magnetic moments of said atomic nuclei occupy a position on the precession cone of said free precession motion, substantially corresponding to the maximum amplitude of said alternating electromotive force induced by said free precession motion;

means, controlled by said frequency measuring means, delivering a substantially rectangular signal having a duration substantially equal to a predetermined number of periods of said free precession motion;

means for deriving from said signal a pulse synchronous with one edge of said signal; and delay means for delaying said pulse by a constant, adjustable value, thereby producing a delayed pulse operating said control means for controlling said switching means to switch said coil from said frequency-measuring means to said source of D.C., thereby starting said first time intervals.

2. Device according to claim 1, wherein said delay means delay said pulse by a value smaller than said period of said free precession motion.

3. Device according to claim 1, further comprising starting means for starting the device, said starting means being capable of initially operating said control means for controlling said switching means to connect said coil to said source of D.C.

4. Device for measuring the intensity of a weak magnetic field comprising in combination:

a vessel containing a solution constituted by a solvent with atomic nuclei having non-zero magnetic moments and by paramagnetic ions dissolved in said solvent, said ions including unpaired electrons and having an electronic resonance line saturable by an alternating field at a non-zero frequency;

means for producing inside said vessel in said solution an alternating field at said non-zero frequency;

a coil disposed around said vessel to be oriented in use with the axis thereof at a substantial angle to the direction of the magnetic field to be measured in which is located in use said vessel;

a source of D.C.;

frequency-measuring means adapted to determine the frequency of an alternating electromotive force;

switching means adapted to connect said coil either to said source of D.C., thereby creating by said coil in said solution an auxiliary D.C. magnetic field of a direction making in use a substantal angle with the direction of the magnetic field to be measured, or to said frequency-measuring means, for determining the frequency of the alternating electromotive force induced in said coil by the free precession motion of said magnetic moments of said atomic nuclei at a frequency proportional to the intensity of the magnetic field to be measured in which is located in use said vessel;

control means for alternatively switching said switching means to have said coil alternatively connected to said source of D.C. for recurrent first time intervals having a duration of the order of the period of said free precession motion and to said frequency-measuring means for recurrent second time intervals alternating with said first time intervals and ending when the magnetic moments of said atomic nuclei occupy a position on the precession cone of said free precession motion, substantially corresponding to the maximum amplitude of said alternating electromotive force induced by said free precession motion;

means, controlled by said frequency measuring means, delivering a substantially rectangular signal having a duration substantially equal to a predetermined number of periods of said free precession motion;

means for deriving from said signal a pulse synchronous with the rear edge of said signal; and delay means for delaying said pulse by a constant, adjustable value, thereby producing a delayed pulse operating said control means for controlling said switching means to switch said coil from said frequency-measuring means to said source of D.C., thereby starting said first time intervals.

5. Device according to claim 4, wherein said means for deriving a pulse synchronous with the rear edge of said signal is constituted by a differentiating circuit.

References Cited by the Examiner
UNITED STATES PATENTS

| 2,912,641 | 11/1959 | Ruble | 324—0.5 |
| 3,004,212 | 10/1961 | Coolidge | 324—0.5 |
| 3,096,476 | 7/1963 | Poindexter et al. | 324—0.5 |
| 3,133,243 | 5/1964 | Bonnet et al. | 324—0.5 |

FOREIGN PATENTS

| 1,221,637 | 1/1960 | France. |

CHESTER L. JUSTUS, *Primary Examiner.*

MAYNARD R. WILBUR, *Examiner.*